United States Patent
Laamanen et al.

(10) Patent No.: US 7,599,386 B2
(45) Date of Patent: Oct. 6, 2009

(54) METHOD FOR ESTABLISHING A SUBSCRIBER CONNECTION AND A SYSTEM UTILIZING THE METHOD

(76) Inventors: Heikki Laamanen, Nuottakuja 2B, FI-02230, Espoo (FI); Umesh Gowda, Kuutamokatu 6 C57, FI-02210, Espoo (FI)

( * ) Notice: Subject to any disclaimer, the term of this patent is extended or adjusted under 35 U.S.C. 154(b) by 293 days.

(21) Appl. No.: 10/595,292
(22) PCT Filed: Oct. 13, 2004
(86) PCT No.: PCT/FI2004/000612

§ 371 (c)(1),
(2), (4) Date: Apr. 5, 2006

(87) PCT Pub. No.: WO2005/039077

PCT Pub. Date: Apr. 28, 2005

(65) Prior Publication Data

US 2006/0285552 A1  Dec. 21, 2006

(30) Foreign Application Priority Data

Oct. 15, 2003  (FI)  ................................. 20031505

(51) Int. Cl.
  H04L 12/66  (2006.01)
  H04J 3/04  (2006.01)
  H04J 14/00  (2006.01)
  H04B 10/00  (2006.01)
(52) U.S. Cl. .................. 370/463; 370/535; 398/67; 398/168
(58) Field of Classification Search .................. 370/463
  See application file for complete search history.

(56) References Cited

U.S. PATENT DOCUMENTS 4,525,834 A  6/1985  Schenkel et al.

(Continued)

FOREIGN PATENT DOCUMENTS

EP  1009156  6/2000

(Continued)

*Primary Examiner*—Daniel J. Ryman
*Assistant Examiner*—Cassandra Decker
(74) *Attorney, Agent, or Firm*—Shalom Wertsberger; Saltamar Innovations (57) ABSTRACT

The objective of the invention is to devise a method for establishing a subscriber connection and a system applying the method. According to the method, a digital subscriber connection consisting of a composition of an optical fiber and a metallic pair cable is implemented by transporting a digital information stream in two directions over an optical fiber (2) between a central site and equipment (103) which is connected to the metallic pair cable (4) of each subscriber. According to the invention, the information streams transmitted and received over the pair cables are multiplexed onto the optical fiber by using a multiplexing method of optical signals, whereby the information streams originating from different subscribers are combined onto the fiber by means of passive optical elements and whereby the information streams transmitted from the central site are distributed to each subscriber-specific optical-to-electric conversion element (105) by means of passive optical elements. Thus the multiplexing and demultiplexing need no active multiplexing/demultiplexing electronics common to all subscribers, but rather the active electronics of the conversion elements (105) of each subscriber operates independently without being dependent on the state of operation of other subscriber's conversion elements. Hence the operating power for said electronics can be fed from the respective subscriber through the subscriber's pair cable.

13 Claims, 6 Drawing Sheets

U.S. PATENT DOCUMENTS

| | | | |
|---|---|---|---|
| 4,991,975 A * | 2/1991 | Alferness et al. | 398/98 |
| 5,202,780 A * | 4/1993 | Fussanger | 398/72 |
| 5,303,229 A * | 4/1994 | Withers et al. | 370/490 |
| 5,526,154 A | 6/1996 | Pyhalammi | |
| 6,031,645 A * | 2/2000 | Ichikawa | 398/41 |
| 6,577,882 B1 | 6/2003 | Roos | |
| 7,259,474 B2 * | 8/2007 | Blanc | 307/45 |
| 2002/0063924 A1* | 5/2002 | Kimbrough et al. | 359/125 |
| 2003/0123648 A1* | 7/2003 | Ashton et al. | 379/403 |
| 2004/0160905 A1* | 8/2004 | Bernier et al. | 370/310 |
| 2004/0175173 A1* | 9/2004 | Deas | 398/42 |
| 2007/0014306 A1* | 1/2007 | Tirri | 370/463 |

FOREIGN PATENT DOCUMENTS

| | | |
|---|---|---|
| EP | 1009156 A2 * | 6/2000 |
| JP | 10322460 | 12/1998 |
| WO | WO 03017634 | 2/2003 |

* cited by examiner

METHOD FOR ESTABLISHING A SUBSCRIBER CONNECTION AND A SYSTEM UTILIZING THE METHOD

The present invention relates to a method of establishing a digital FTTC (Fiber To The Curb, Fiber To The Cabinet) subscriber connection comprising an optical fiber and a metallic twisted pair cable. The invention also consists of converter equipment connecting the fiber and the cable and an arrangement for supplying the operating power for the equipment, said converter equipment being an integral element of the subscriber connection.

BACKGROUND OF THE INVENTION

In a conventional subscriber network based on a twisted metallic pair cable, each subscriber is connected to a local telephone exchange or concentrator via said subscriber's own cable pair. A typical length of cable may be several kilometers. If the pair cable is utilized for transmitting digital information by means of DSL (Digital Subscriber Line) modem techniques, the transfer characteristics of the cable limit the highest achievable transmission rate from a few hundred kilobits per second to a few megabits per second, depending primarily on the cable length.

Subsequently the term "central site" represents the local telephone exchange or concentrator site.

Subsequently a DSL modem stands for, in a broader sense, a transmission device, which converts a digital information stream into an analog signal that can be transmitted over a metallic pair cable by utilizing a usable frequency band and which detects a received signal and converts it reliably into the original digital information stream. A metallic pair cable is a very difficult transmission media incurring strong linear amplitude and phase distortion among other impairments. These impairments are typically equalized by using tools offered by digital signal processing, e.g. adaptive line equalization. Several different modulation methods can be used, e.g. DMT modulation (Discrete MultiTone) or QAM (Quadrature Amplitude Modulation). The modulation method utilized and the detailed implementation of the signal processing, for example, are not essential for the operation of the method and system according to the invention.

When utilizing a conventional subscriber network for digital transmission, the signal conversion in the interface of the subscriber cable and the trunk network is typically carried out by DSLAM equipment (Digital Subscriber Line Access Multiplexer). A DSLAM comprises DSL modems, which transform the digital signal into an analog form suitable for transmission over the metallic cable. The DSL modems also receive the signal coming from the far end subscriber transmitter and convert the signal into digital form. Furthermore, the DSLAM multiplexes traffic from several subscribers and transmits the traffic to the trunk network.

Figure 1:
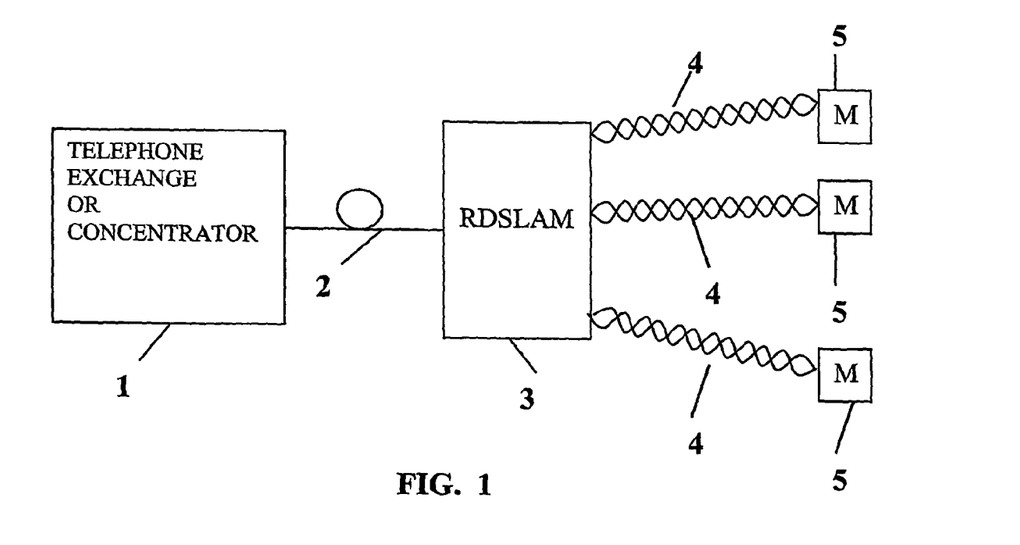
FIG. 1 represents the structure of a prior-art FTTC subscriber network and the RDSLAM equipment residing at the subscriber end of an optical fiber.

In a digital FTTC subscriber network, data streams for several subscribers are multiplexed to an optical fiber and transported nearer to the subscribers over the fiber so that the lengths of the metallic pair cables are substantially shorter as compared to a conventional subscriber network. As a consequence, the digital transmission speed can be increased considerably, because the shorter the cable is, the higher the usable bandwidth. A new problem arises in an FTTC network from the fact that now the DSLAM is placed nearer to the subscribers and away from the central site. The DSLAM of a conventional network is installed at the central site, where it is much easier to arrange the necessary power supply and where the environmental factors (temperature and humidity) crucial for the equipment electronics are easier to control. In an FTTC network topology, the remote DSLAM (subsequently RDSLAM) has to be installed, for example, in a box located at a street corner, where the power supply arrangement is laborious and where the electronics suffer from wide temperature and humidity variations. A substantial portion of the electronics of DSLAM equipment is located in the digital transceivers of the DSL modems and in the circuitry multiplexing the data stream onto the optical fiber. Also, a substantial amount of power consumption is used for supplying said electronics. FIG. 1 represents FTTC network topology based on known technology. An optical fiber 2 connects RDSLAM equipment 3 to equipment 1 at the central site, where the fiber is connected to a switching device of the trunk network, e.g. an ATM switch or an IP router, depending on the transport protocol.

The method described in U.S. Pat. No. 5,526,154 to Pyhalammi succeeds in overcoming some of the problems described above. According to the method of reference, the analog interface of the DSL modems at the central site DSLAM is connected to the system so that the central site equipment converts the modem analog signal into a digital sample sequence. The sample sequence is transmitted through an optical fiber to the far end and converted back into an analog signal, which is then fed into a twisted pair subscriber cable. The same procedure is carried out as well in the reverse transmission direction, from the subscriber towards the central site. Hence the system is entirely symmetrical, and identical equipment is needed at both ends of the optical fiber. Thus the interface between the system and the central site DSL modems connects analog signals in both 15 transmission directions. In another method of reference, the modem signals are multiplexed as analog signals by using analog modulation and demodulation.

In WO03017634 the present inventors introduced a method whereby the equipment at the subscriber end of the optical fiber can be implemented with simple active electronics comprising only the analog parts of the DSL modems and a multiplexer element adapting the analog-to-digital and digital-to-analog converters of the analog parts to the optical fiber.

In the methods of the above-cited references the electronics of RDSLAM equipment are considerably simpler compared to a conventional RDSLAM. In systems according to the cited methods, likewise in a conventional FTTC system, there is still a problem in supplying the operating electric power. The operating power has to be fed to the equipment either from the central site via a power feeding cable or by connecting a power feeding cable from the main system for electricity distribution to the RDSLAM. The installation and maintenance cost is thus increased, primarily because it is not always possible to draw power-feeding cables through the shielding tubes originally intended for optical fibers.

The objective of the present invention is to overcome the problems of prior-art technology and to provide an entirely novel method for establishing an FTTC subscriber network and arranging the operating power feeding for RDSLAM equipment.

SUMMARY OF THE INVENTION

The objective of the invention is to forge a method which enables subscriber-specific conversion equipment which adapts an optical fiber to a pair cable and is located at the end of the fiber near the subscribers to operate independently, without being dependent on the operation of the conversion equipment of other subscribers, making it possible to feed the operating electric power for the conversion equipment of each subscriber via the respective metallic pair cable from the subscriber end of the pair cable.

Subsequently the term "multiplexing of optical signals" stands for a multiplexing method whereby (i) subscriber-specific electric signals (information streams) originating from several subscribers are first converted into subscriber-specific optical signals and said optical signals are further combined and fed onto an optical fiber by means of passive optical elements and (ii) subscriber-specific optical signals (information streams) produced at the central site, transmitted over the optical fiber and intended for each subscriber are first distributed to each subscriber-specific conversion element by means of passive optical elements and said conversion element separates the subscriber-specific signal from other subscribers' signals, converts the signal into an electric signal, and feeds the electric signal into the pair cable of the respective subscriber.

In a preferred embodiment of the invention, the RDSLAM equipment contains all the essential electronics of the DSL modems, comprising a digital transmitter and receiver and modem analog parts. The digital information stream specific for each subscriber is transported over the optical fiber in both directions by multiplexing optical signals.

In a second preferred embodiment of the invention, the RDSLAM equipment contains only the analog parts of the modems, whereas the digital transceivers are located at the central site. The digital sample sequences transferred between the subscriber-specific transceiver and the analog parts are transported over the optical fiber by utilizing a multiplexing method of optical signals.

In a third preferred embodiment, the RDSLAM equipment contains only the analog parts, excluding the AD and DA converters (Analog-to-Digital and Digital-to-Analog converters). The optical fiber transports full-duplex analog signals, which are specific for each subscriber, between the AD and DA converters located at the central site and the analog parts located in the RDSLAM equipment. Said analog signals of each subscriber are separated from each other by multiplexing optical signals.

The invention offers substantial advantages.

In FTTC topology, the operating power for the electronics of the RDSLAM equipment installed in the hard environment at the subscriber end of the optical fiber can be fed through each subscriber cable from the subscriber end of the cable, thus eliminating the problems inherent in remote power feeding from the central site or from the main system for the distribution of electricity.

In the following, the invention will be examined in greater detail with the help of exemplifying embodiments and the appended drawings.

DETAILED DESCRIPTION OF THE INVENTION

The following abbreviations are used in this document:

| | |
|---|---|
| AD converter, ADC | Analog-to-Digital converter |
| AGC | Automatic Gain Control |
| ATM | Asynchronous Transfer Mode |
| DA converter, DAC | Digital-to-Analog Converter |
| DMT modulation | Discrete MultiTone modulation |
| DSL | Digital Subscriber Line |
| DSLAM | Digital Subscriber Line Access Multiplexer |
| FTTC | "Fiber To The Curb", "Fiber To The Cabinet", subscriber network consisting of an optical fiber and a metallic cable |
| O/E | Optical-to-Electric conversion |
| PCM | Pulse Code Modulation |
| QAM | Quadrature Amplitude Modulation |
| IP | Internet Protocol |
| RDSLAM | Remote DSLAM of an FTTC network |
| VDSL | Very high speed Digital Subscriber Line |

Basic Idea of the Invention

The basic idea of the method in accordance with the invention is that the transmitted and received bit streams transported over each pair cable are transmitted and received over the optical fiber by the RDSLAM using a multiplexing method based on the multiplexing of optical signals. Hence the multiplexing requires no common multiplexing electronics and the operation of the optical-to-electric and electric-to-optical conversion electronics of each subscriber is not dependent on the condition of the conversion electronics of other subscribers. This makes it possible to feed the operating power for the optical-to-electric and electric-to-optical conversion electronics of each subscriber, which is located in the RDSLAM, through the pair cable of each subscriber. In an RDSLAM based on prior-art technology, the multiplexing equipment common to all DSL modems requires such high power that it is not possible to feed all the power through the pair cable of only one subscriber. But it is necessary that the equipment functions even when only one subscriber connection is active at a time.

Figure 2:
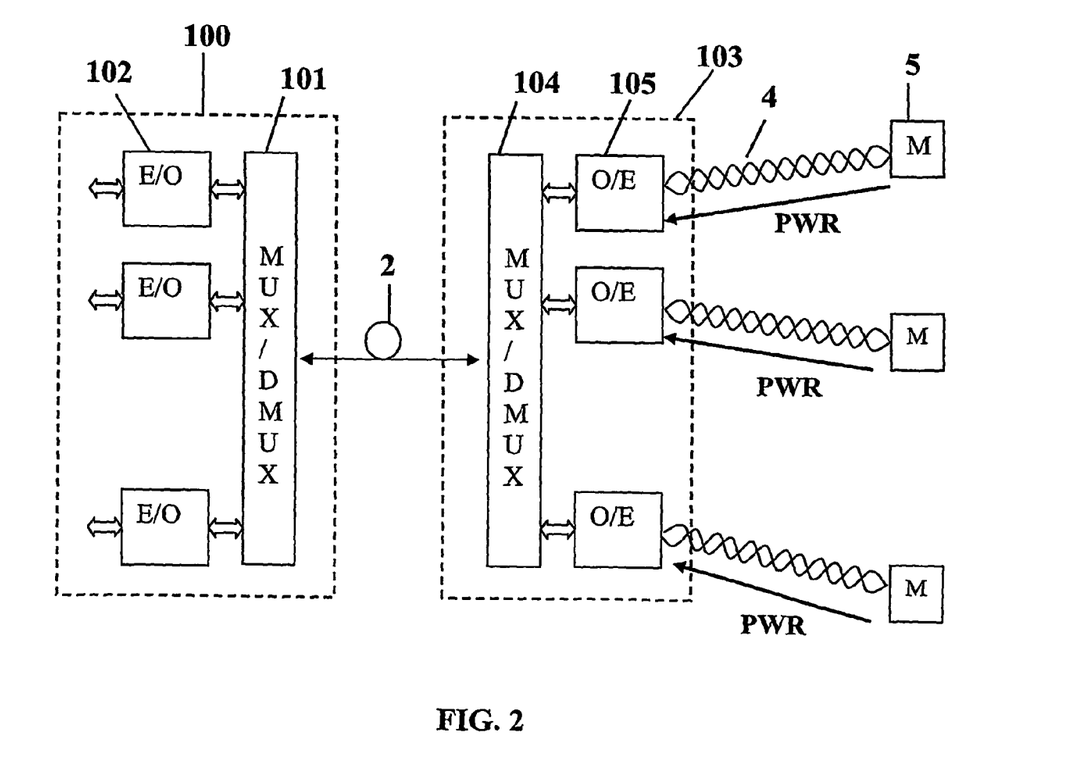
FIG. 2 depicts a principle of the invention whereby the electric signal that is transmitted over the metallic pair cable of each subscriber is converted into an optical signal, either in digital or analog form, and transported over the optical fiber by multiplexing the signals of each subscriber in optical form, and whereby the operating electric power for the electronics specific for each subscriber is fed from each subscriber's modem through the cable of each subscriber.

FIG. 2 depicts essential details of the method according to the invention. An optical fiber 2 is connected between the conversion and multiplexing equipment 100 at the central site and the RDSLAM equipment 103 which is closer to the subscribers. A metallic pair cable 4 connects the DSL modem 5 of each subscriber to the RDSLAM. Data is transported in both directions over a pair cable 4 by using a modulation method appropriate for a subscriber cable, for example, a DMT or QAM method referred to in VDSL standard drafts. A conversion element 105 converts an electric signal received from the pair cable into optical form. Furthermore, the conversion element 105 converts an optical signal, received from the optical fiber and intended for a specific subscriber, into an electric signal to be transmitted over the pair cable. A conversion element 102, located in the central site equipment, carries out a corresponding conversion at the central site. In the electric-to-optical conversion, the signal is also converted into digital form so that the signal is transported over the optical fiber in digital form. In some embodiments, the signal is transported over the optical fiber in analog form instead of digital form. An optical multiplexer/demultiplexer 101, located in the central site equipment, and a corresponding optical multiplexer/demultiplexer 104, located in the RDSLAM, multiplex the optical signals of different subscribers onto the optical fiber, so that the signal of each subscriber can be demultiplexed and separated at the far end of the fiber. Because the multiplexing of signals respective to different subscribers is performed by the processing optical signals, there are no common electronics for all subscribers, and the operation of each subscriber's electronics is completely independent of the functioning of other subscribers' electronics. Hence the electronics of each subscriber are also completely electrically independent of other subscribers' electronics, so that the operating power for each subscriber's electronics, which are located in the RDSLAM, can be fed through each subscriber's pair cable from the subscriber's modem 5. The details for the implementation of the system can vary. Some preferred embodiments are examined in the following.

A Preferred Embodiment

Figure 3:
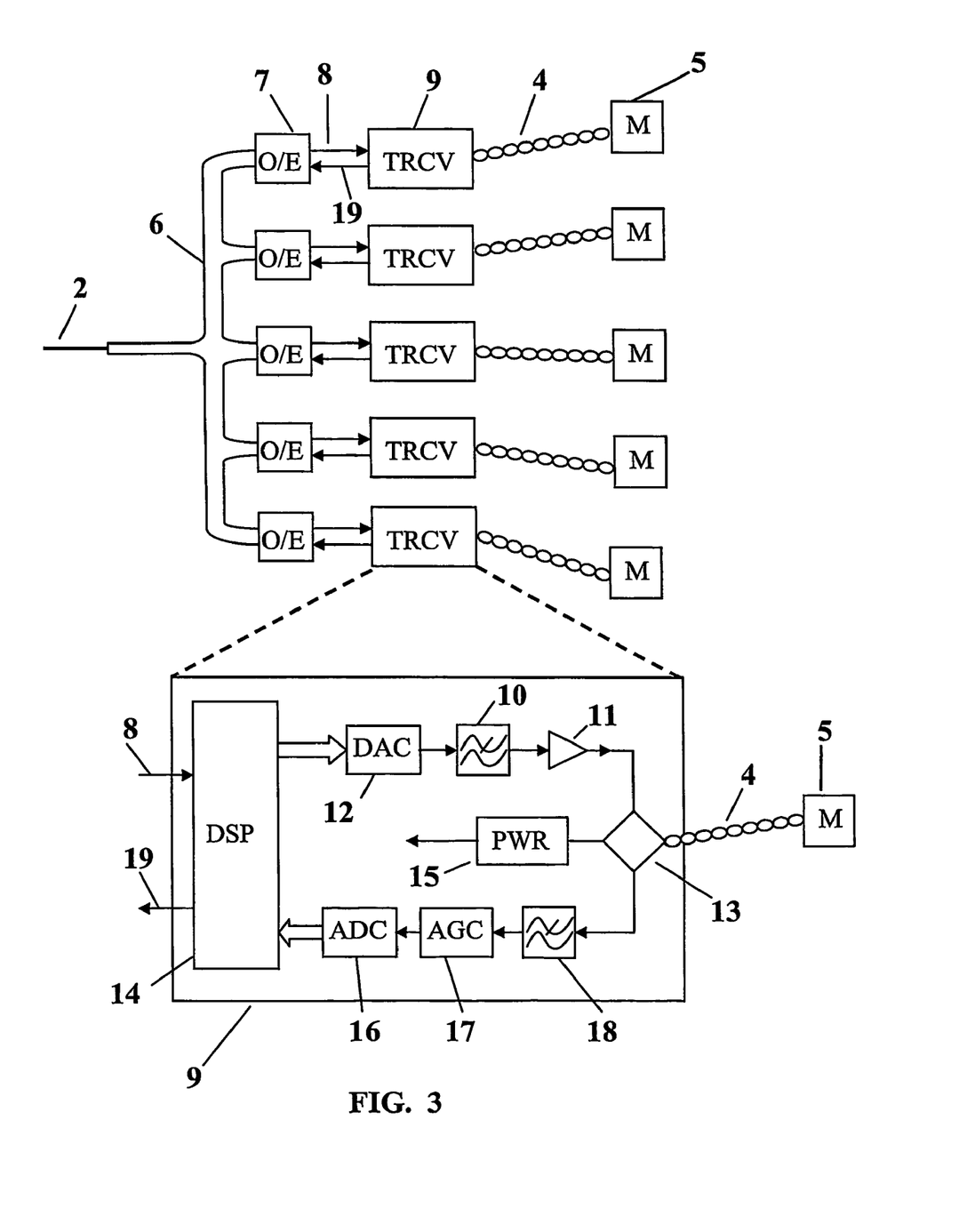
FIG. 3 illustrates a principle according to the invention whereby the subscriber-specific electronics located in the RDSLAM comprise the digital transceiver and the analog parts of a DSL modem.

In a method according to the invention and presented in FIG. 3, the equipment needed at the subscriber end of the optical fiber, located for example in a street corner cabinet, comprises the essential electronics of the DSL modems 9 (TRCV) including a digital transmitter and receiver 14 (DSP), analog parts, as well as other parts. The essential elements of the analog parts are a digital-to-analog converter 12 (DAC), a transmitter analog filter 10, a line driver 11, a hybrid 13, a receiver analog filter 18, a controllable level-adjusting amplifier 17 (AGC), and an analog-to-digital converter 16 (ADC). Said elements and their operation are well known to an expert in the field, so it is not necessary to give a more detailed description of them.

Figure 6:
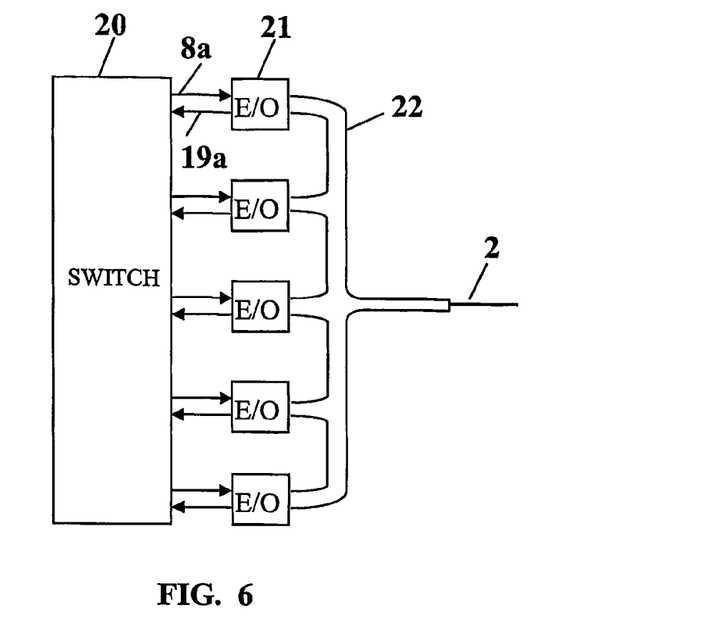
FIG. 6 illustrates central site equipment which is compatible with the RDSLAM of FIG. 3.

A data switch 20 (FIG. 6) contained by the central site equipment multiplexes bit streams 8a intended for different subscribers over optical fiber 2 by means of a conversion element 21 (FIG. 6). The optical bit stream transmitted from the central site over the optical fiber is first distributed to a conversion element 7 (O/E) of each subscriber by means of an optical hybrid 6. The conversion element 7 converts the optical signal into electrical form and picks up a bit stream 8 intended for each subscriber. The bit stream 8 is fed to a transmitter of a DSL modem 9, which converts the stream into a signal appropriate for transmitting over the metallic pair cable to the receiver of a subscriber modem 5. The following procedure is carried out in the other transmission direction. A signal transmitted by the subscriber's modem 5 over the metallic pair cable is processed and detected by the receiver of the DSL modem 9. A detected bit stream 19 originating from a subscriber is converted into optical form by a conversion element 7, using a multiplexing method whereby bit streams originating from different subscribers can be separated by a respective conversion element 21 at the central site (FIG. 6). The bit streams 19a received from different subscribers are fed into a data switch 20, which processes the data streams according to the applied protocol, e.g. Ethernet protocol.

Signal multiplexing is carried out by multiplexing and demultiplexing optical signals according to the method illustrated in FIG. 3 whereby the conversion element of each subscriber is completely electrically independent from all other conversion elements in the RDSLAM. Hence the operating power can be fed to each subscriber's modem and conversion element from the subscriber end of the cable. This is carried out by feeding a DC current from a current supply element of a modem 5 to the cable and by conveying the current through a hybrid 13 to a power converter element 15, which generates the operating power for the device. Remote power feeding over a subscriber cable is prior-art technology and has long been used, for example, in PCM repeaters, and the details of implementation are not essential for the operation of the present method.

Second Preferred Embodiment

Figure 4:
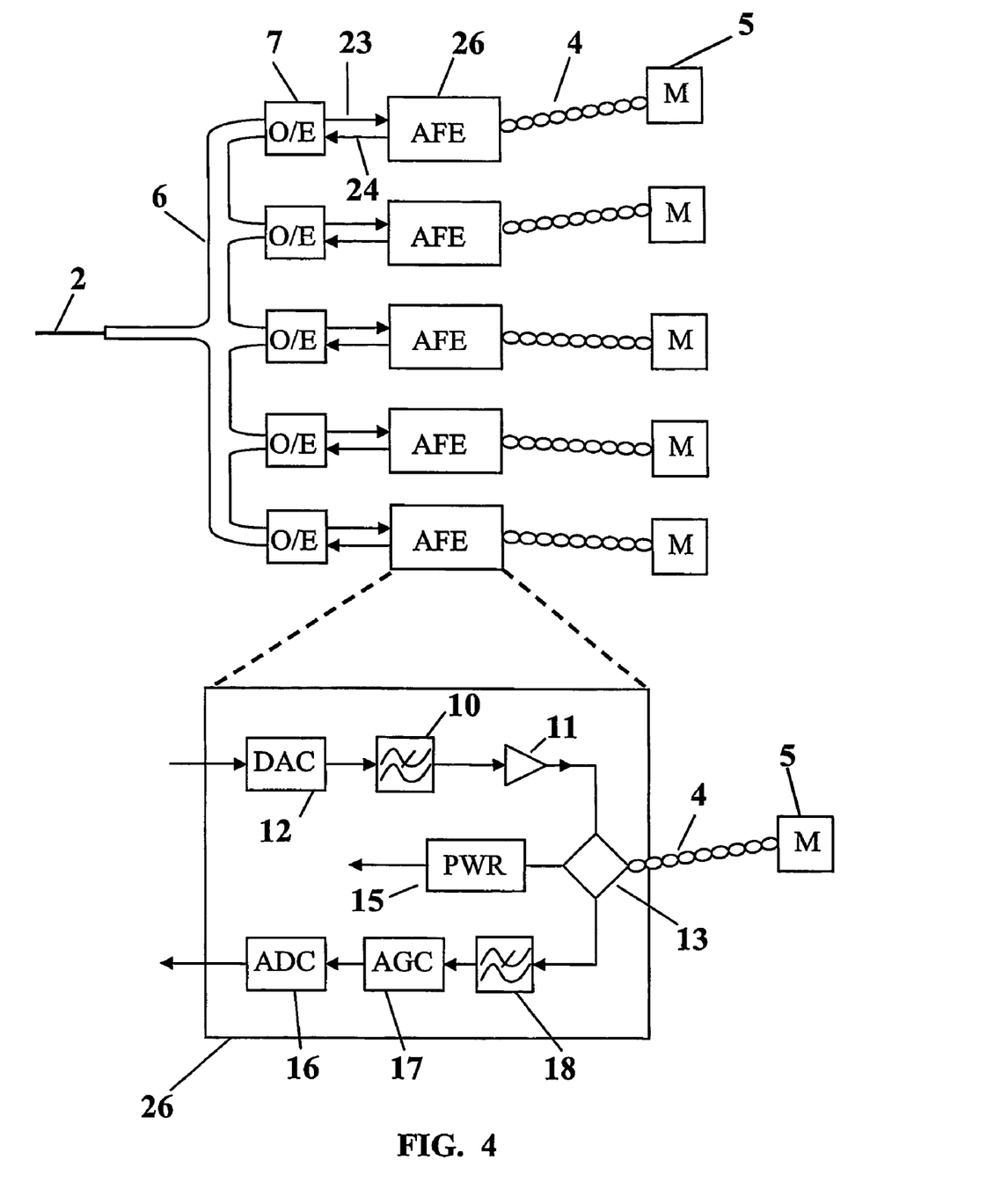
FIG. 4 describes a principle of the invention whereby the subscriber-specific electronics located in the RDSLAM comprises only the analog parts of the DSL modems, including the AD and DA converters.

FIG. 4 depicts the second preferred embodiment of the method in accordance with the invention. The embodiment is very similar to the previous embodiment of FIG. 3, with the difference that the RDSLAM equipment contains only the analog parts 26 of the modems, the digital transceivers 9 of the modems (FIG. 7) being located at the central site. Optical fiber 2 transports a digital sample sequence 23 from the transmitter of the transceiver to the DA converter, and said optical fiber also transports a digital sample sequence 24 from the AD converter to the receiver of the transceiver, the AD and DA converters being located in the RDSLAM and the transmitter and receiver being located at the central site. The signal transported over the optical fiber is distributed to each subscriber by an optical hybrid 6. A conversion element 7 demultiplexes from said signal a sample sequence intended for the DA converter of each subscriber. Furthermore, the conversion element 7 converts into optical signals sample sequences 24 produced by each subscriber's AD converter and multiplexes them to the optical fiber by means of the optical hybrid 6.

Figure 7:
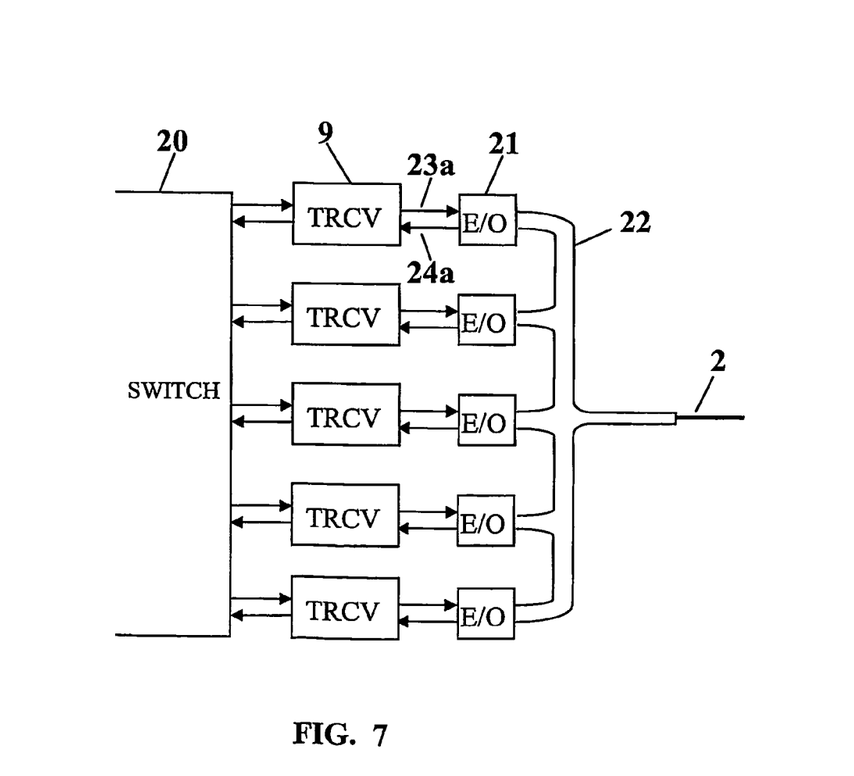
FIG. 7 represents central site equipment which is compatible with the RDSLAM of FIG. 4.

FIG. 7 illustrates equipment at the central site corresponding to the RDSLAM of FIG. 4. An optical hybrid 22 and a conversion element 21 perform tasks similar to the optical hybrid 6 and conversion element 7 of the RDSLAM in FIG. 4. The optical fiber transports digital sample sequences 23a and 24a between the DA and AD converters and the digital transceivers 9. The transceivers are connected to a data switch 20, for example, to an Ethernet switch.

Signal multiplexing is carried out by multiplexing and demultiplexing optical signals in accordance with the method according in FIG. 4. Therefore, the electronics of each subscriber and their functioning in the RDSLAM are independent of the state of other subscriber's electronics. Hence the operating power for said electronics can be fed from the subscriber end of a cable, i.e. DC current is fed to the cable from a current supply element of the subscriber's modem 5. The DC current that is flown through the cable is conveyed by a hybrid 13 to a power converter element 15, which generates the operating power for the device.

Third Preferred Embodiment

Figure 5:
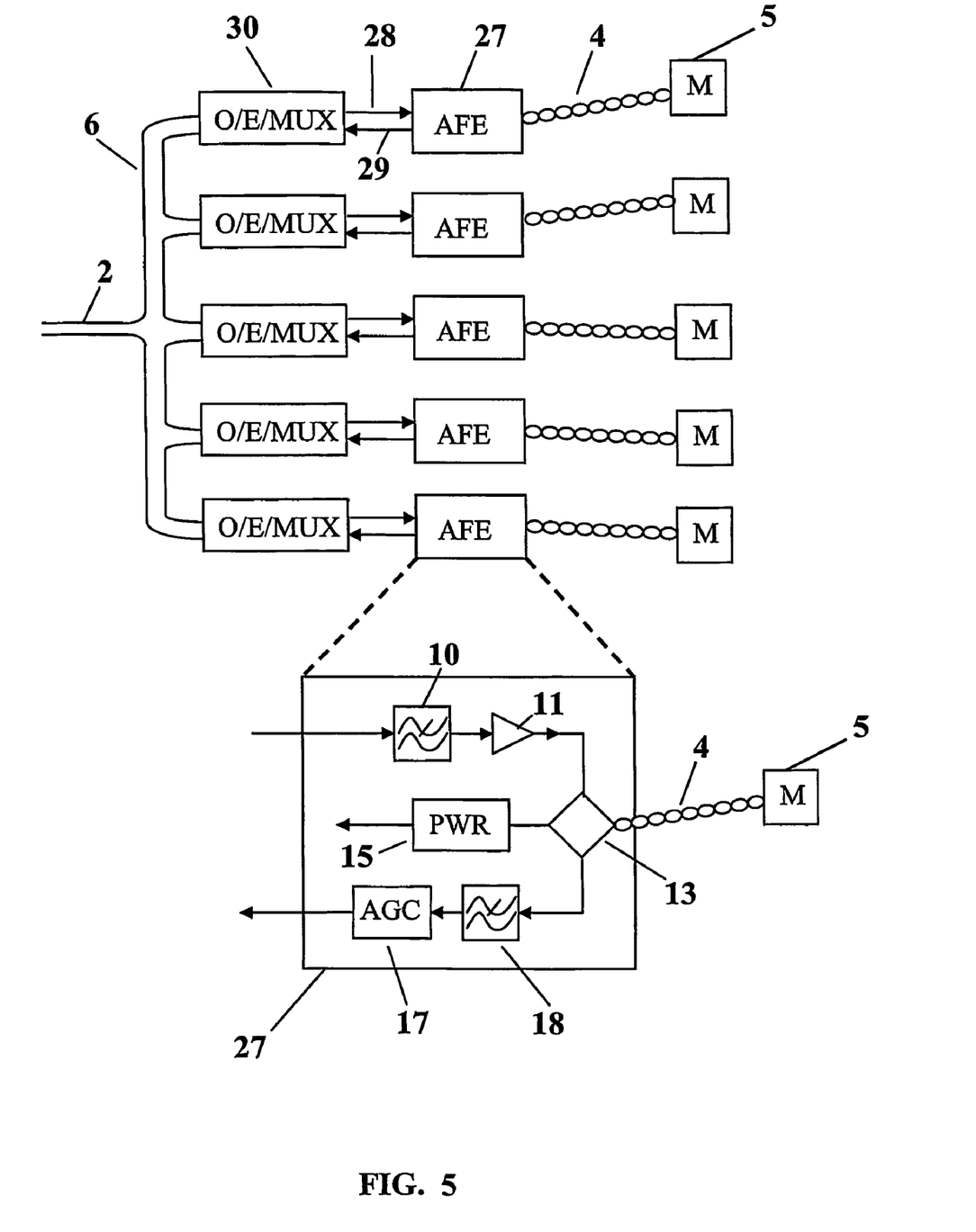
FIG. 5 depicts a principle of the invention whereby the subscriber-specific electronics located in the RDSLAM comprises only the analog parts of the DSL modems, excluding the AD and DA converters.
Figure 8:
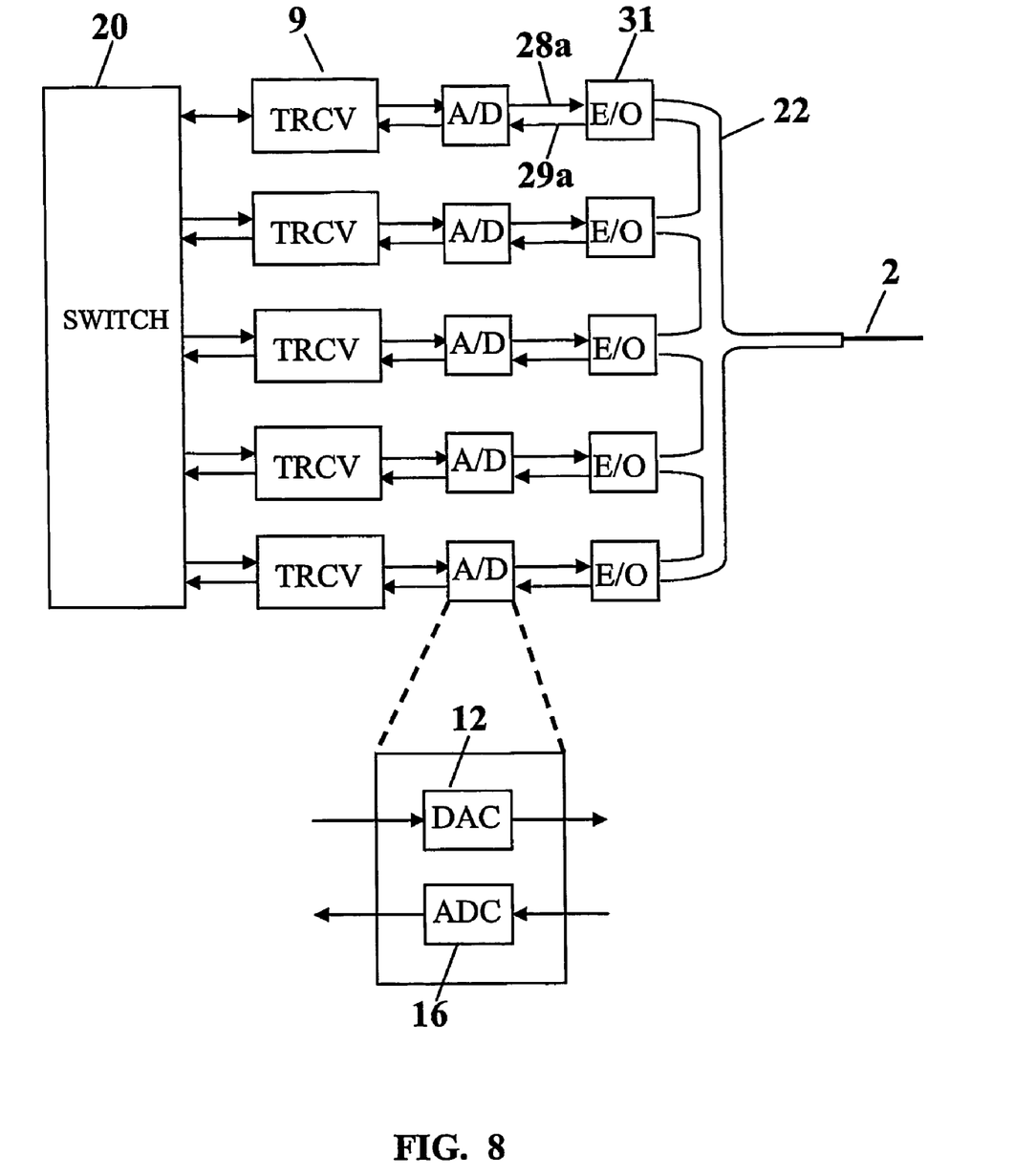
FIG. 8 illustrates central site equipment which is compatible with the RDSLAM depicted in FIG. 5.

FIG. 5 depicts the third preferred embodiment of the method in accordance with the invention. In this embodiment, the RDSLAM equipment comprises only modem analog parts 27, excluding the AD and DA converters. The AD and DA converters 12 and 16 are now located at the central site according to FIG. 8 and connected directly to digital transceivers 9. An optical fiber 2 transports an analog signal 28a produced by the DA converter, whereby the signal is multiplexed in the fiber optically in analog form in such a way that the received signals 28 (FIG. 5) can be separated from each other by the RDSLAM equipment. Respectively, the analog signals 29 produced by each subscriber's analog parts and intended for the AD converters are transported over the optical fiber multiplexed optically in such a way that each subscriber's signal 29a (FIG. 8) can be separated from the others' at the central site. The multiplexing, demultiplexing, and conversion from and into electrical and optical forms of the above-mentioned signals are carried out by means of an optical hybrid 6 and a conversion element 30 in the RDSLAM (FIG. 5) and by means of an optical hybrid 22 and a conversion element 31 at the central site (FIG. 8). The digital transceivers 9 in FIG. 8 at the central site are connected to a data switch 20. Accordingly, analog signals are multiplexed over the optical fiber in this embodiment, whereas digital signals are multiplexed in the first two embodiments. Consequently, in this embodiment different characteristics are required for signal multiplexing than those required in the first two embodiments.

Multiplexing of Optical Signals

It is possible to implement the multiplexing of optical signals by means of several different methods. Which is the most favorable multiplexing method greatly depends on the available technology, especially on the status of the optical component technology. However, the multiplexing method utilized is not essential for the technical functioning of the method according to the invention. Next to be depicted are certain methods feasible with state-of-the-art technology for multiplexing optical signals. There is great variation in such methods when comparison is based on the implementation costs resulting from available technology. However, the advancement of technology, especially laser technology, may change the situation in the future.

Optical Multiplexing Method 1

The signals of different subscribers are separated from each other by applying the wavelength multiplexing of optical signals. The signal of each subscriber is transported over the optical fiber by using a different wavelength for the signal of each subscriber, so that the signals of different subscribers can then be separated from each other with appropriate filters in the receiver.

Optical Multiplexing Method 2

The signals of different subscribers are separated from each other by applying the frequency division modulation of a laser beam. This method is also a kind of wavelength multiplexing, but now the signals of different subscribers are at a distance ranging from a few MHz to about 10-30 MHz in the frequency domain. The modulation is implemented in the first phase by modulating the signal of each subscriber so that the subscribers' signals are located at the above-mentioned distance from each other in the frequency domain. Thereafter, a laser transmitter is modulated with the signal produced in the first phase. The signal processing within the system may be implemented partly with the aid of digital signal processing and partly by means of analog circuitry.

In so far as this method is applied for transporting signals from the RDSLAM to the central site, the frequencies of each subscriber's transmitter have to be mutually interlocked. Interlocking can be implemented, for example, by synchronizing the lasers' frequencies with a pilot signal contained in the optical signal received from the central site.

Optical Multiplexing Method 3

The signals of different subscribers are multiplexed on the optical fiber by using time division multiplexing. A subscriber-specific time window is at each subscriber's disposal by turns, so that only one subscriber's signal is transferred on the fiber within that time window.

Optical Multiplexing Method 4

The signals of different subscribers are multiplexed on the optical fiber by using code division multiplexing. The signal of each subscriber is transferred at the same optical signal wavelength so that each subscriber's signal is separated from the others' by using a different code sequence for each subscriber.

Because the third preferred embodiment of the method in accordance with the invention is based on the optical multiplexing of analog signals, all multiplexing methods described above are not suitable for implementing the third embodiment. The optical multiplexing methods 1 and 2 illustrated above can be applied for multiplexing analog signals with present technology.

Although the above description of the invention refers to the examples in the accompanying drawings, it is apparent to an expert in the field that the invention is not limited by the examples but that various modifications are possible within the scope of the invention claimed. For example, (a) the fiber link may comprise several full-duplex fibers or there may be separate fibers for the two transmission directions, (b) the multiplexing methods depicted above can be applied in various combinations and (c) other multiplexing methods than depicted above can be used. For example, it is possible to use a combination of time division and frequency division multiplexing methods.

The invention claimed is:

1. A method for establishing subscriber connections between a central site and a plurality of subscriber premises in a Fiber To The Curb (FTTC) network, the method comprising:

coupling an RDSLAM by at least one optical fiber to the central site;

coupling the at least one optical fiber to a passive optical element in the RDSLAM;

coupling a plurality of subscriber transmission devices to the RDSLAM via a corresponding plurality of subscriber-specific electrically conductive transmission lines;

coupling each subscriber-specific electrically conductive transmission line to a corresponding one of subscriber-specific conversion elements in the RDSLAM; and coupling each of the conversion elements optically to the passive optical element, wherein each of the conversion elements is constructed to:

(a) produce a subscriber-specific electric signal from downstream signals received from the passive optical element and to feed the subscriber-specific electric signal to the corresponding electrically conductive transmission line;

(b) convert a subscriber-specific upstream signal received from the corresponding electrically conductive transmission line to an upstream optical signal and to feed the upstream optical signal to the passive optical element;

(c) operate independently of other conversion elements in the RDSLAM; and (d) receive operating power of that conversion element through the corresponding electrically conductive transmission line;

and wherein the passive optical element is constructed to:

(a) receive the downstream signals from the at least one optical fiber and distribute the downstream signals to the conversion elements; and (b) combine the upstream optical signals received from the conversion elements onto the at least one optical fiber.

2. A method according to claim 1, further comprising the steps of: inserting a power-generating element into at least one of the conversion elements; and constructing the power-generating element to produce operating power for the corresponding conversion element from electric power received through the corresponding electrically conductive transmission line.

3. A method according to claim 1, further comprising a step of feeding electric power from a subscriber transmission device through the corresponding electrically conductive transmission line to the corresponding conversion element.

4. A method according to claim 1, wherein at least one conversion element is constructed to convert the downstream signals from optical form to electric form; and separate the subscriber-specific electric signal from the converted signals.

5. A method according to claim 1, wherein at least one conversion element is constructed to separate a subscriber-specific signal from the downstream signals; and convert the separated signal from optical form to electric form, thereby to obtain the subscriber-specific electric signal.

6. A Fiber To The Curb (FTTC) network comprising:
at least one optical fiber coupled to a central site at its first end;
an RDSLAM coupled to a second end of the at least one optical fiber, the RDSLAM being located at an intermediate site between the central site and a plurality of subscriber transmission devices and the RDSLAM being further provided with a passive optical element coupled with the at least one optical fiber, and with a plurality of subscriber specific conversion elements coupled to the passive optical element; and
a plurality of subscriber-specific electrically conductive transmission lines coupled between the plurality of conversion elements and the corresponding plurality of subscriber transmission devices;
wherein the passive optical element is constructed to:
(a) receive downstream signals from the at least one optical fiber and distribute the downstream signals to the conversion elements; and
(b) combine upstream optical signals received from the conversion elements onto the at least one optical fiber,
and wherein each of the conversion elements is constructed to:
(a) produce a subscriber-specific electric signal from the downstream signals received from the passive optical element and to feed the subscriber-specific electric signal to the corresponding electrically conductive transmission line;
(b) convert a subscriber-specific upstream signal received from the corresponding electrically conductive transmission line to an upstream optical signal and to feed the upstream optical signal to the passive optical element;
(c) operate independently of other conversion elements in the RDSLAM; and
(d) receive operating power of that conversion element through the corresponding electrically conductive transmission line.

7. A Fiber To The Curb (FTTC) network according to claim 6, wherein at least one of the conversion elements comprises a power-generating element for producing operating power for that conversion element from electric power received from the corresponding electrically conductive transmission line.

8. A Fiber To The Curb (FTTC) network according to claim 6, further comprising a power supply constructed to supply the operating power required by each conversion element through the corresponding electrically conductive transmission line.

9. A Fiber to the Curb (FTTC) network according to claim 8, wherein the power supply comprises current feeding means in each subscriber transmission device, the current feeding means being constructed to feed direct electric current onto the corresponding electrically conductive transmission line.

10. An RDSLAM equipment for a Fiber To The Curb (FTTC) network, the RDSLAM equipment comprising:
an optical interface for connecting the RDSLAM equipment to at least one optical fiber;
an electric interface for connecting the RDSLAM equipment to a plurality of subscriber-specific electrically conductive transmission lines;
a passive optical element coupled to the optical interface for receiving and sending optical signals therethrough; and
a plurality of subscriber-specific conversion elements each coupled to a corresponding one of the subscriber-specific electrically conductive transmission lines and to the passive optical element,
wherein the passive optical element is constructed to:
(a) receive downstream signals from the at least one optical fiber and distribute the downstream signals to the conversion elements; and
(b) combine upstream optical signals received from the conversion elements onto the at least one optical fiber,
and wherein each of the conversion elements is constructed to:
(a) produce a subscriber-specific electric signal from the downstream signals received from the passive optical element and to feed the subscriber-specific electric signal to the corresponding electrically conductive transmission line;
(b) convert a subscriber-specific upstream signal received from the corresponding electrically conductive transmission line to an upstream optical signal and to feed the upstream optical signal to the passive optical element;
(c) operate independently of other conversion elements in the RDSLAM; and
(d) receive operating power of that conversion element through the corresponding electrically conductive transmission line.

11. An RDSLAM equipment according to claim 10, wherein each subscriber-specific conversion element comprises a power-generating element constructed to receive electric power from the corresponding electrically conductive transmission line and to produce operating power for the corresponding conversion element from the electric power.

12. An RDSLAM equipment according to claim 10, wherein the optical signals are in digital form and the subscriber-specific electric signal is in analog form.

13. A RDSLAM equipment according to claim 10, wherein the optical signals are in analog form and the subscriber-specific electric signal is in analog form.

* * * * *